(12) United States Patent
Agrawal et al.

(10) Patent No.: US 6,694,303 B1
(45) Date of Patent: Feb. 17, 2004

(54) METHOD AND SYSTEM FOR BUILDING A NAIVE BAYES CLASSIFIER FROM PRIVACY-PRESERVING DATA

(75) Inventors: Rakesh Agrawal, San Jose, CA (US); Ramakrishnan Srikant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,697

(22) Filed: Jan. 19, 2000

(51) Int. Cl.[7] .............................. G06F 9/44; G06N 7/02; G06N 7/06
(52) U.S. Cl. ............................ 706/52; 706/46; 706/11
(58) Field of Search ............................... 706/52, 46, 11

(56) References Cited

U.S. PATENT DOCUMENTS

| | | | |
|---|---|---|---|
| 6,115,708 A | 9/2000 | Fayyad et al. ................. | 707/6 |
| 6,405,200 B1 * | 6/2002 | Heckerman .................... | 707/6 |
| 6,546,389 B1 * | 4/2003 | Agrawal et al. ............... | 707/6 |

OTHER PUBLICATIONS

Patent Application: "Method and System For Reconstructing Original Distributions From Randomized Numeric Data", Agrawal et al. U.S. Ser. No. 09/487,642, filed Jan. 19, 2000. Missing Structure & Naive Bayes Classified Model.
Patent Application: "System and Architecture For Privacy-Preserving Data Mining". Agrawal et al. U.S. Ser. No. 09/487,191, filed Jan. 19, 2000. Missing Structure & Naive Bayes Classified Model.

"Security-Control Methods for Statistical Databases: A Comparative Study". Adam and Wortmann. ACM Computing Surveys, vol. 21, No. 4. pp. 515-556. Dec. 1989. Missing Specific Structure & Naive Bayes Classified Model.

"A Modified Random Perturbation Method for Database Security". Tendick and Matloff. ACM Transactions on Database Systems, vol. 19, No. 1, pp. 47-63. Mar., 1994. Missing Specific Structure & Naive Bayes Classified Model.

* cited by examiner

Primary Examiner—Ramesh Patel
Assistant Examiner—Joseph P. Hirl
(74) Attorney, Agent, or Firm—John L. Rogitz

(57) ABSTRACT

A system and method for mining data while preserving a user's privacy includes perturbing user-related information at the user's computer and sending the perturbed data to a Web site. At the Web site, perturbed data from many users is aggregated, and from the distribution of the perturbed data, the distribution of the original data is reconstructed, although individual records cannot be reconstructed. Based on the reconstructed distribution, a decision tree classification model or a Naive Bayes classification model is developed, with the model then being provided back to the users, who can use the model on their individual data to generate classifications that are then sent back to the Web site such that the Web site can display a page appropriately configured for the user's classification. Or, the classification model need not be provided to users, but the Web site can use the model to, e.g., send search results and a ranking model to a user, with the ranking model being used at the user computer to rank the search results based on the user's individual classification data.

19 Claims, 3 Drawing Sheets

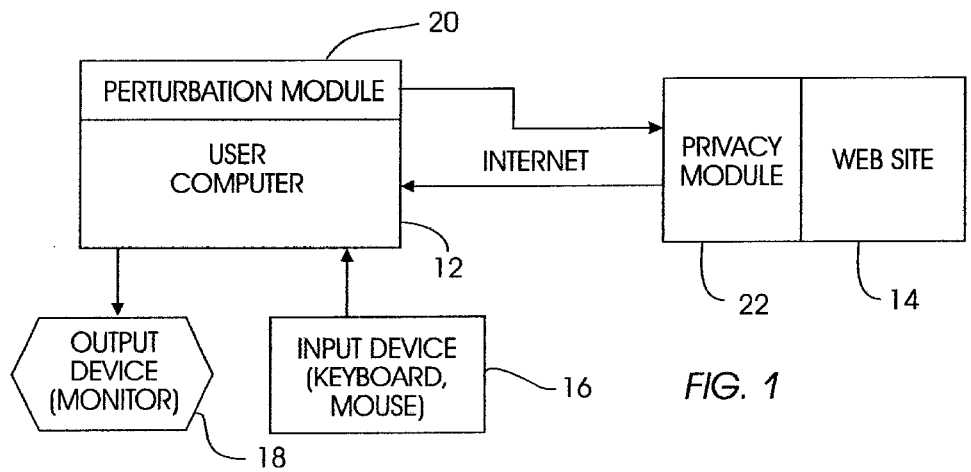
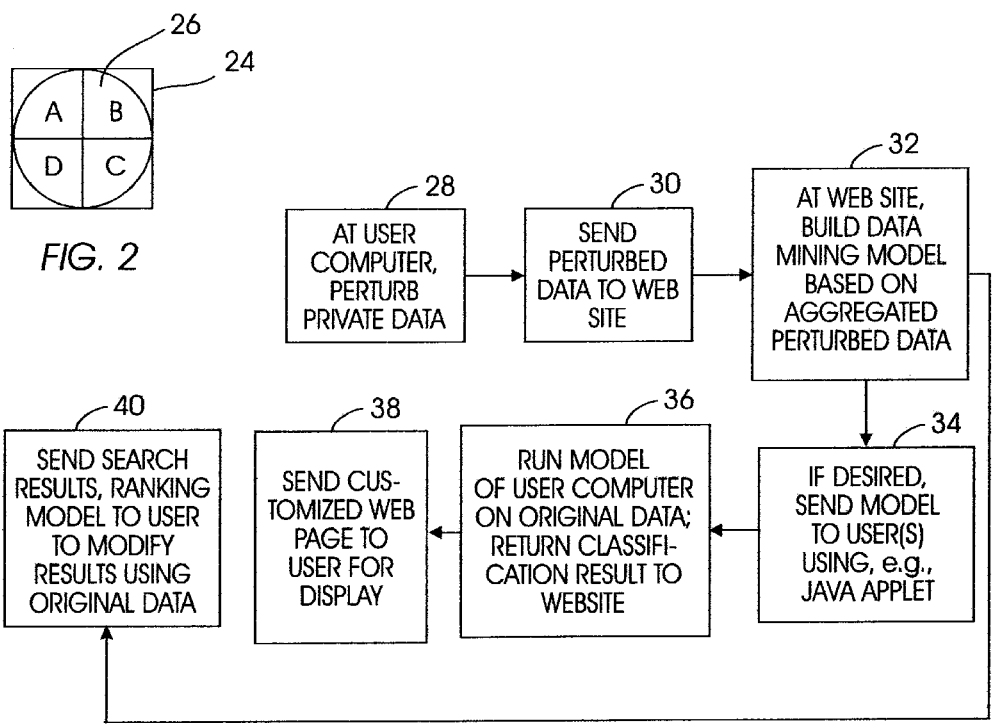
FIG. 1
FIG. 2
FIG. 3
OVERALL FLOW

RECONSTRUCTING ORIGINAL DISTRIBUTION

DECISION TREE CLASSIFIER

NAIVE BAYES CLASSIFIER

METHOD AND SYSTEM FOR BUILDING A NAIVE BAYES CLASSIFIER FROM PRIVACY-PRESERVING DATA

BACKGROUND OF THE INVENTION

1. Field of the Invention

The present invention relates to mining data from Internet users while preserving the privacy of the users.

2. Description of the Related Art

The explosive progress in computer networking, data storage, and processor speed has led to the creation of very large data bases that record enormous amounts of transactional information, including Web-based transactional information. Data mining techniques can then be used to discover valuable, non-obvious information from large databases.

Not surprisingly, many Web users do not wish to have every detail of every transaction recorded. Instead, many Web users prefer to maintain considerable privacy. Accordingly, a Web user might choose not to give certain information during a transaction, such as income, age, number of children, and so on.

It happens, however, that data mining of Web user information is not only useful to, e.g., marketing companies, but it is also useful in better serving Web users. For instance, data mining might reveal that people of a certain age in a certain income bracket might prefer particular types of vehicles, and generally not prefer other types. Consequently, by knowing the age and income bracket of a particular user, an automobile sales Web page can be presented that lists the likely vehicles of choice to the user, before other types of vehicles, thereby making the shopping experience more relevant and efficient for the user. Indeed, with the above in mind it will be appreciated that data mining makes possible the filtering of data to weed out unwanted information, as well as improving search results with less effort. Nonetheless, data mining used to improve Web service to a user requires information that the user might not want to share.

As recognized herein, the primary task of data mining is the development of models about aggregated data. Accordingly, the present invention understands that it is possible to develop accurate models without access to precise information in individual data records. Surveys of Web users indicate that the majority of users, while expressing concerns about privacy, would willingly divulge useful information about themselves if privacy measures were implemented, thereby facilitating the gathering of data and mining of useful information. The present invention has carefully considered the above considerations and has addressed the noted problems.

SUMMARY OF THE INVENTION

The invention is a general purpose computer programmed according to the inventive steps herein to mine data from users of the Internet while preserving their privacy. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer-implemented method is disclosed for generating a classification model based on data received from at least one user computer via the Internet while maintaining the privacy of a user of the computer. The method includes perturbing original data associated with the user computer to render perturbed data, and reconstructing an estimate of a distribution of the original data using the perturbed data. Then, using the estimate, at least one Naive Bayes classification model is generated.

Preferably, perturbed data is generated from plural original data associated with respective plural user computers. At least some of the data can be perturbed using a uniform probability distribution or using a Gaussian probability distribution. Furthermore, at least some of the data is perturbed by selectively replacing the data with other values based on a probability.

As set forth in detail below, the reconstruction act includes iteratively determining a density function. The particularly preferred reconstructing act includes partitioning the perturbed data into intervals, and iteratively determining a partition probability using the intervals. Preferably, this is iteratively undertaken by determining classes of the data, and determining a class probability using training data. Also, a probability of a record given a class is determined using the training data. Then, a probability of a class given a record is determined based on the class probability and the probability of a record given a class. In one preferred embodiment, the training data is the estimate, and the reconstructing act is undertaken before the act of generating the classifier.

In another aspect, a computer system includes a program of instructions that in turn includes structure to undertake system acts which include, at a user computer, randomizing at least some original values of at least some numeric attributes to render perturbed values. The program also sends the perturbed values to a server computer. At the server computer, the perturbed values are processed to generate at least one Naive Bayes classification model.

In still another aspect, a system storage device includes system readable code that is readable by a server system for generating at least one Naive Bayes classification model based on original data values stored at plural user systems without knowing the original values. The device includes logic means for randomizing at least some original values of at least some numeric attributes to render perturbed values. Also, the device includes logic means for sending the perturbed values to a server computer. Moreover, logic means are available to the server computer for processing the perturbed values to generate at least one Naive Bayes classification model.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a schematic diagram of a computer program product;

FIG. 3 is a flow chart of the overall logic;

DETAILED DESCRIPTION OF THE PREFERRED EMBODIMENTS

Figure 4:
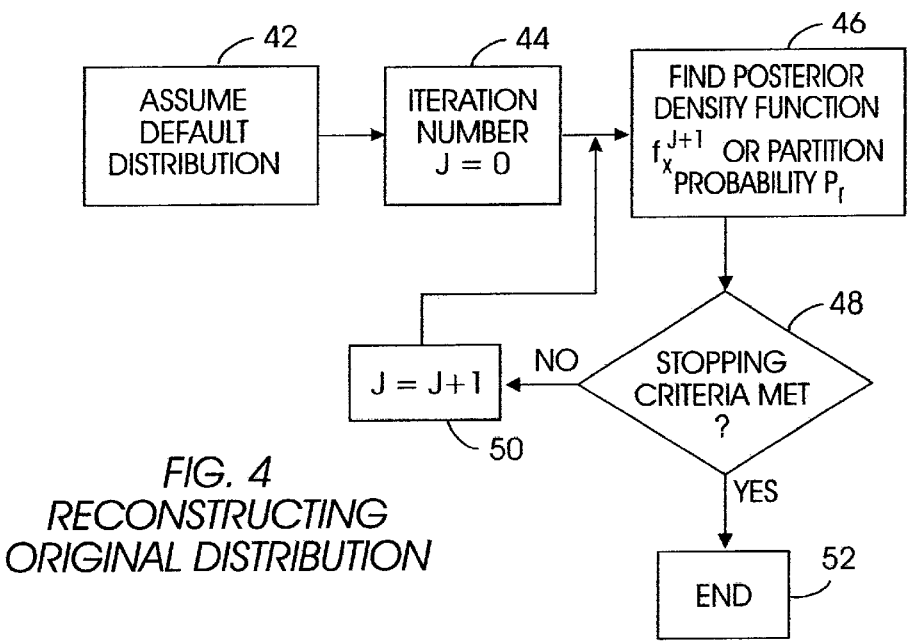
FIG. 4 is a flow chart of the logic for reconstructing the data distribution of the original user data.

Referring initially to FIG. 1, a system is shown, generally designated 10, for mining data from plural user computers 12 (only a single user computer 12 shown in FIG. 1 for clarity of disclosure) such that computer-implemented Web sites 14 can more effectively serve the user computers 12 while preserving the privacy of the user computers 12. The user computer 12 includes an input device 16, such as a keyboard or mouse, for inputting data to the computer 12, as well as an output device 18, such as a monitor, for displaying Web pages that have been tailored for the particular user of the computer 12. The Web pages are sent via the Internet from, e.g., the Web site 14.

One or both of the computer 12/Web site 14 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as printers, other computers or data storage devices, and computer networks.

In any case, the processor of the user computer 12 accesses a perturbation module 20 to undertake certain of the logic of the present invention, while the Web site 14 accesses a privacy module 22 to undertake certain of the present logic. The modules 20, 22 may be executed by a processor as a series of computer-executable instructions. The instructions may be contained on a data storage device with a computer readable medium, such as a computer diskette 24 shown in FIG. 2 having a computer usable medium 26 with code elements A–D stored thereon. Or, the instructions may be stored on random access memory (RAM) of the computers, on a DASD array, or on magnetic tape, conventional hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Now referring to FIG. 2, at block 28, the perturbation module 20 perturbs original data that the user of the user computer 12 wishes to remain private. For example, the user's age, income, and number of children might be perturbed at block 28. In one preferred embodiment, the data is perturbed using randomization.

For numerical attributes $x_i$ such as age and salary, a perturbed value of $x_i+r$ is returned, where r is a random value selected from a distribution. In one embodiment, the distribution is uniform, i.e., r has a uniform probability distribution between $[-\alpha, +\alpha]$ with a mean of 0. In another embodiment, the distribution is Gaussian, i.e., r has a normal distribution with a mean "$\mu$" of 0 and a standard deviation $\sigma$. In contrast, for categorical attributes such as profession, the true value of the attribute is returned with a probability p, with a value chosen at random from the other possible values for that attribute being returned with a probability of 1−p.

Proceeding to block 30, in the preferred implementation the perturbed data is sent to the privacy module 22 at the Web site 14 via the Internet. Moving to block 32, the privacy module 22 builds a data mining model, also referred to herein as a classification model, based on the aggregated perturbed data from many users. The details of preferred methods for building the models, including reconstructing the distribution of the original data, are set forth further below. It is noted here, however, that although the preferred method includes reconstructing the distribution of the original data from the distribution of the perturbed data, the Web site 14 does not know and cannot reconstruct original data, i.e., the attribute values of individual records from any user computer.

Once a data mining model is generated, several options are possible. For example, at block 34 the model can be sent as a JAVA applet to a user computer 12, which can then run the model at block 36 on its original records to determine a classification in accordance with the model. For example, the model might determine, based on the user's age and salary and assuming that the Web site is, e.g., the site of a vehicle vendor, that the user is of a classification that is inclined to purchase sports utility vehicles. The classification, but not the original data, can be returned to the Web site 14, which can then send a Web page that has been customized for the user's particular classification to the user computer 12 at block 38 for display of the page on, e.g., the monitor 18. Accordingly, the returned Web page might display and list SUVs more prominently than other vehicles, for the user's convenience, without compromising the privacy embedded in the original data, which is not available to the Web site 14.

Another option is shown at block 40 in FIG. 3. If the user has generated a search request, the Web site 14 can return to the user the complete search results, along with a data mining model for ranking search results based on classification. The user computer 12 can then use the model to process its original data to return a classification, which is then used to rank the search results as a convenience for the user. Again, however, the user's original data remains unavailable to the Web site 14.

In the preferred embodiment, the data mining model is generated not from a distribution of the perturbed data, but from an estimate of the distribution of the original data that is reconstructed from the distribution of the perturbed data, to improve the accuracy of the model. The estimate of the original distribution is referred to herein as the reconstructed distribution. FIG. 4 shows the presently preferred method for generating the reconstructed distribution. As noted further below in reference to FIGS. 5 and 6, the algorithm shown in FIG. 4 can be used prior to constructing the classification models or it can be integrated into the model generation process. Less preferably, in addition to or in lieu of generating the model, if desired the reconstructed data can be used for clustering or simply to gain an insight into the profile of the users of the system.

Commencing at block 42, a default uniform distribution is initially assumed, and at block 44 an integration cycle counter "j" is set equal to zero. Moving to block 46, the derivative of the posterior density function $f_x^{j+1}$ can be determined for each attribute "a" using the following equation:

$$f_x^{j+1}(a) := (1/n) \times \text{(over } i = 1 \text{ to } n) \text{ of}$$

$$\left\{ [f_y(w_i - a) f_x^j(a)] \Big/ \int \text{(from } -\infty \text{ to } +\infty) \text{ of } [f_y(w_i - z) f_x^j(z) dz] \right\},$$

where $f_x$=derivative of the posterior distribution function for the reconstructed distribution, $f_y$=derivative of the posterior distribution function for the distribution of the perturbed data, n=number of independent random variables $Y_1, Y_2, \ldots, Y_n$, with $y_i$ being the realization of $Y_i$, it being understood that "Y" herein was referred to as "r" in the discussion of FIG. 3, $w_i=(x_i+y_i)$, a=attribute under test, and z is an integration variable satisfying, if Y is the standard normal, $F_Y(z)=(1/((2\pi)^{0.5})e^{-(x^*x)/2}$.

More preferably, to speed processing time, instead of determining the derivative of the posterior density function $f_x^{J+1}$ at block 46, a partitioning of the domain of original data values for each attribute into "m" intervals "I" is assumed, and a probability $Pr(X \in I_p)$ that an original data point "X" lies within an interval $I_p$ of the original distribution is found as follows. First, the distance between z and $w_i$ (or between a and $w_i$) is approximated to be the distance between the midpoints of the intervals in which they lie. Also, the density function $f_x(a)$ is approximated to be the average of the density function in the interval in which the attribute "a" lies.

With this in mind, $$Pr'(X \in I_p) =$$

$$(1/n) \sum \text{(over } s = 1 \text{ to } m) \text{ of } \{N(I_s) x [(f_Y(m(I_s) - m(I_p)) Pr(X \in I_p))] \Big/ [$$

$$\sum \text{(over } t = 1 \text{ to } m) \text{ of } (f_Y(m(I_s) - m(I_t)) pr(X \in I_t))],$$

, where

I(x) is the interval in which "x" lies, $m(I_p)$ is the midpoint of the interval $I_p$, and $f(I_p)$ is the average value of the density function over the interval $I_p$, p=1, . . . m.

Using the preferred method of partitioning into intervals, the step at block 46 can be undertaken in $O(m^2)$ time. It is noted that a naive implementation of the last of the above equations will lead to a processing time of $O(m^3)$; however, because the denominator is independent of $I_p$, the results of that computation are reused to achieve $O(m^2)$ time. In the presently preferred embodiment, the number "m" of intervals is selected such that there are an average of 100 data points in each interval, with "m" being bound $10 \leq m \leq 100$.

It is next determined at decision diamond 48 whether the stopping criterion for the iterative process disclosed above has been met. In one preferred embodiment, the iteration is stopped when the reconstructed distribution is statistically the same as the original distribution as indicated by a $X^2$ goodness of fit test. However, since the true original distribution is not known, the observed randomized distribution (of the perturbed data) is compared with the is compared with the result of the current estimation for the reconstructed distribution, and when the two are statistically the same, the stopping criterion has been met, on the intuition that if these two are close, the current estimation for the reconstructed distribution is also close to the original distribution.

When the test at decision diamond 48 is negative, the integration cycle counter "j" is incremented at block 50, and the process loops back to block 46. Otherwise, the process ends at block 52 by returning the reconstructed distribution.

Figure 5:
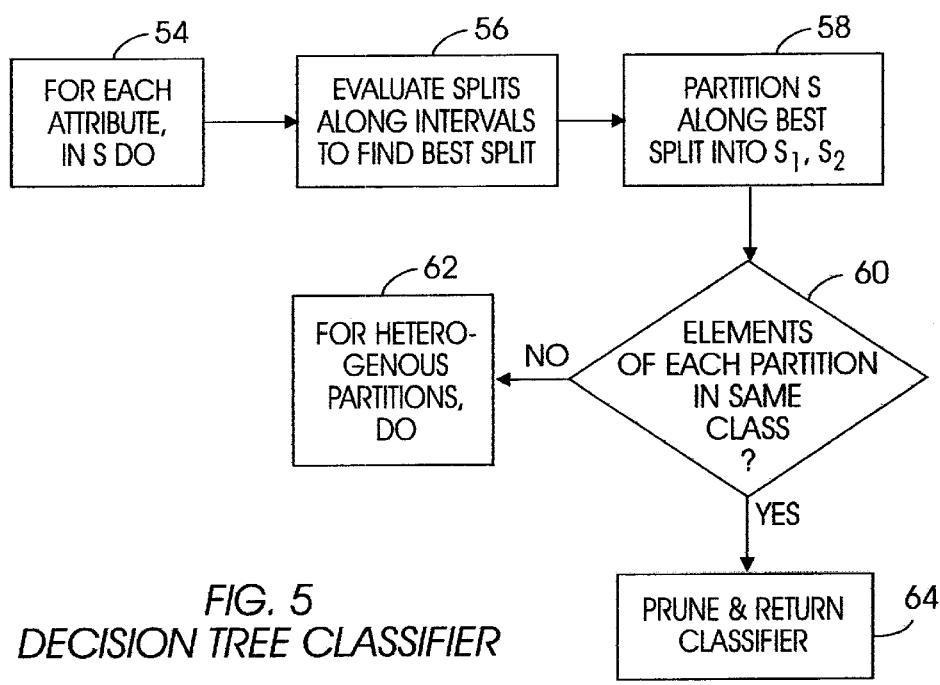
FIG. 5 is a flow chart of the logic for generating a decision tree classifier.

Now referring to FIG. 5, the logic for constructing a decision tree classifier using the reconstructed distribution is seen. Commencing at block 54, for reach attribute in the set "S" of data points, a DO loop is entered. Moving to block 56, split points for partitioning the data set "S" pursuant to growing the data tree are evaluated. Preferably, the split points tested are those between intervals, with each candidate split point being tested using the so-called "gini" index set forth in *Classification and Regression Trees,* Breiman et al., Wadsworth, Belmont, 1984. To summarize, for a data set S containing "n" classes (which can be predefined by the user, if desired) the "gini" index is given by $$1 - \sum p_j^2,$$

, where $p_j$ is the relative frequency of class "j" in the data set "S". For a split dividing "S" into subsets S1 and S2, the index of the split is given by:

index=$n_1/n$(gini(S1))+$n_2/n$(gini(S2)), where $n_1$=number of classes in S1 and $n_2$=number of classes in S2.

The data points are associated with the intervals by sorting the values, and assigning the $N(I_1)$ lowest values to the first interval, the next highest values to the next interval, and so on. The split with the highest gini index is then used at block 58 to partition the data set into two subsets, with the lower intervals relative to the split point being in one subset and the higher intervals being in the other.

Proceeding to decision diamond 60, it is determined, for each partition, whether most elements in the partition are of the same class. If they are not, the logic proceeds to block 62 for each heterogenous partition to loop back to block 56 to further split that partition. Otherwise, when all partitions consist of elements most of which are of the same class, the logic prunes the tree at block 64 to remove dependence on statistical noise or variation that may be particular only to the training data, in accordance with decision tree prune principles set forth in, e.g., Minimum Description Length disclosed by Mehta et al. in "A Fast Scalable Classifier for Data Mining", *Proc. of the Fifth Int'l Conf. on Extending Database Technology,* Avignon, France (1996). The pruned tree is returned as the classifier. Thus, it is to be appreciated that since the preferred embodiment uses reconstructed data derived from the perturbed data, in a general sense the perturbed data is used to generate the classifier.

When using the logic of FIG. 5, the reconstruction logic of FIG. 4 can be invoked in one of three places. First, the reconstructed distribution can be generated for each attribute once prior to executing the logic of FIG. 5 using the complete perturbed data set as the decision tree training set. The decision tree of FIG. 5 is then induced using the reconstructed distribution.

Or, for each attribute, the training (perturbed) data can first be split by class, and then reconstructed distributions generated separately for each class, with the decision tree of FIG. 5 being induced using the reconstructed distribution. Yet again, the by-class reconstruction need not be done once at the beginning, but rather at each node during the decision tree growth phase, i.e., just before block 56 of FIG. 5. We have found that the latter two methods very accurately track the original data and at the same time maintain the inability to know any particular original attribute value with any meaningful accuracy. For instance, in one experiment using a synthetic data generator and a training set of 100,000 records, the true age value for any particular original record could not be known, with 95% confidence, within an interval any smaller than 60 years. Nonetheless, the classifier generated by the above-disclosed reconstruction and decision tree logic very accurately resembled a similar classification model generated using the original data as a control. Moreover, we found that using a Gaussian randomizer at block 28 of FIG. 3 resulted in even better privacy than using a uniform distribution randomizer, and that use of a Gaussian randomizer decreased the requirement for the reconstruction logic of FIG. 4, although combining a Gaussian randomizer with reconstruction improved accuracy vis-a-vis generating a data mining decision tree model using uncorrected Gaussian-perturbed data.

Figure 6:
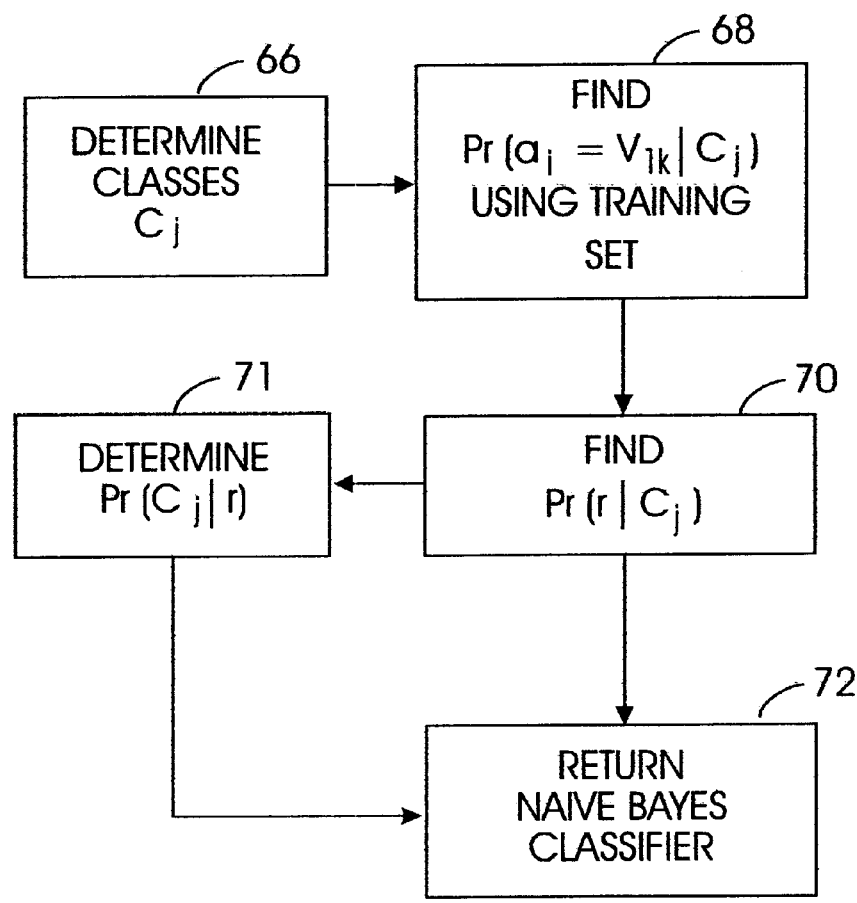
FIG. 6 is a flow chart of the logic for generating a Naive Bayes classifier.

FIG. 6 shows that as an alternative to generating a decision tree classifier, a Naive Bayes classification model can be generated. Commencing at block 66, the classes $c_j$ of data are determined empirically or using a decision tree-like growth phase such as the one shown in FIG. 5, with the leaf nodes of the tree defining the classes. Moving to block 68, the probability $Pr(a_i=v_{ij}|C_j)$ of the $i^{th}$ attribute "a" of a record having a value $v_{ij}$ belonging to the $j^{th}$ class is determined by determining the ratio of the number of records in the $j^{th}$ class, divided by the total number of records, using the perturbed data as a training set.

Next, the logic determines proceeds to block 70, wherein the probability $Pr(r|C_j)$ of a record "r" given a class $C_j$ is determined to be $\Pi$ (i=1 to n) of $Pr(a_i=v_i|C_j)$, where $a_i$ is an attribute that has the value $v_i$. As before, the preferred way to undertake the above calculation is to partition the perturbed (training) data set into "m" intervals "I", and approximate $Pr(a_i=v_i|C_j)$ with $Pr(a_i\epsilon P_i/C_j$=the number of records whose class is $C_j$, where the value of the attribute $a_i$ is in the $i^{th}$ interval partition. Mathematically, this is expressed as $\{N(C_j \Lambda a_i \epsilon P_i)\}/N(C_j)$. Also, the class probability $Pr(C_j)$ of a class occurring is determined using the training set.

After the step at block 70, at block 71 the probability $Pr(C_j|r)$ of a record r being in the class $C_j$ is determined by combining the probability $Pr(r|C_j)$ with the class probability $Pr(C_j)$. In a preferred embodiment, this is done by multiplying the value found at block 68 by the value determined at block 70 (i.e., $\{N(C_j \Lambda a_i \epsilon P_i)\}/N(C_j)$. The set of these probabilities for the various classes identified at block 66 is then returned at block 72 as the Naive Bayes classifier.

When using the logic of FIG. 6, the reconstruction logic of FIG. 4 can be invoked in one of two places. First, the reconstructed distribution can be generated for each attribute once prior to executing the logic of FIG. 6 using the complete perturbed data set as the training set. The Naive Bayes classifier of FIG. 6 is then induced using the reconstructed distribution. Or, for each attribute, the training (perturbed) data can first be split by class, and then reconstructed distributions generated separately for each class, i.e., after block 66.

While the particular METHOD AND SYSTEM FOR BUILDING A NAIVE BAYES CLASSIFIER FROM PRIVACY-PRESERVING DATA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for generating a classification model based on data received from at least one user computer via the Internet while maintaining the privacy of a user of the computer, comprising the acts of:

at the user computer, randomly perturbing original data associated with the user computer to render perturbed data;

sending only the perturbed data to a Web server;

reconstructing an estimate of a distribution of the original data using the perturbed data at the Web server, the Web server not having access to the original data; and using the estimate, generating at least one Naive Bayes classification model without accessing the original data.

2. The method of claim 1, wherein perturbed data is generated from plural original data associated with respective plural user computers.

3. The method of claim 2, wherein at least some of the data is perturbed using a uniform probability distribution.

4. The method of claim 2, wherein at least some of the data is perturbed using a Gaussian probability distribution.

5. The method of claim 2, wherein at least some of the data is perturbed by selectively replacing the data with other values based on a probability.

6. The method of claim 2, wherein the reconstruction act includes iteratively determining a density function.

7. The method of claim 2, wherein the reconstruction act includes:

partitioning the perturbed data into intervals; and iteratively determining a partition probability using the intervals.

8. The method of claim 7, wherein the generating act is undertaken in iterations by:

determining classes of the data;

determining a class probability using training data;

determining a probability of a record given a class using the training data; and determining a probability of a class given a record based on the class probability and the probability of a record given a class.

9. The method of claim 8, wherein the training data is the estimate.

10. The method of claim 9, wherein the reconstructing act is undertaken before the act of generating the classifier.

11. A computer system including a program of instructions including structure to undertake system acts comprising:

at a user computer, randomizing at least some original values of at least some numeric attributes to render perturbed values;

sending the perturbed values to a server computer; and at the server computer, processing the perturbed values to generate at least one Naive Bayes classification model.

12. The system of claim 11, wherein perturbed values are generated from plural original values associated with respective plural user computers.

13. The system of claim 11, wherein at least some of the original values are perturbed using a uniform probability distribution or a Gaussian probability distribution.

14. The system of claim 12, wherein at least some of the data is perturbed by selectively replacing the data with other values based on a probability.

15. The system of claim 12, wherein the reconstruction act includes iteratively determining a density function.

16. A system storage device including system readable code readable by a server system for generating at least one Naive Bayes classification model based on original data values stored at plural user systems without knowing the original values, comprising:

logic means at a user computer for randomizing at least some original values of at least some numeric attributes to render perturbed values;

logic means for sending the perturbed values to a server computer; and logic means available to the server computer for processing the perturbed values to generate at least one Naive Bayes classification model.

17. The system of claim 16, wherein perturbed data is generated from plural original data associated with respective plural user computers.

18. The system of claim 17, wherein at least some of the data is perturbed using a uniform probability distribution.

19. The system of claim 17, wherein at least some of the data is perturbed using a Gaussian probability distribution.

* * * * *